(12) United States Patent
Kudo (10) Patent No.: US 9,658,449 B2
(45) Date of Patent: May 23, 2017

(54) LIGHT SCANNING APPARATUS AND IMAGE FORMING APPARATUS HAVING THE SAME

(71) Applicant: CANON KABUSHIKI KAISHA, Tokyo (JP)

(72) Inventor: Genichiro Kudo, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/590,307

(22) Filed: Jan. 6, 2015

(65) Prior Publication Data

US 2015/0205097 A1    Jul. 23, 2015

(30) Foreign Application Priority Data

Jan. 17, 2014   (JP) .................. 2014-006929

(51) Int. Cl.
| | |
|---|---|
| *G02B 26/12* | (2006.01) |
| *B41J 2/45* | (2006.01) |
| *G03G 15/04* | (2006.01) |
| *G03G 15/043* | (2006.01) |

(52) U.S. Cl.
CPC ........... *G02B 26/124* (2013.01); *B41J 2/451* (2013.01); *G02B 26/123* (2013.01); *G03G 15/043* (2013.01); *G03G 15/0409* (2013.01)

(58) Field of Classification Search
CPC .. G02B 26/121; G02B 23/123; G02B 26/125; G02B 26/127; G02B 17/008; B41J 2002/14459; B41J 2/45; B41J 2/471; B41J 2/473

USPC ................. 347/230, 233, 241–244, 256–261
See application file for complete search history.

(56) References Cited

U.S. PATENT DOCUMENTS

| | | | | |
|---|---|---|---|---|
| 6,839,157 | B2 * | 1/2005 | Ono et al. ................. | 359/204.1 |
| 6,930,812 | B2 * | 8/2005 | Yamawaki ................ | 359/204.1 |
| 8,711,457 | B2 * | 4/2014 | Kato et al. ................ | 359/206.1 |
| 8,830,288 | B2 * | 9/2014 | Shimomura .............. | 347/244 |

(Continued)

FOREIGN PATENT DOCUMENTS

| | | |
|---|---|---|
| JP | 2002-258184 A | 9/2002 |
| JP | 2003-107381 A | 4/2003 |

(Continued)

OTHER PUBLICATIONS

Office Action for corresponding Japanese Application No. 2014-006929 mailed Jul. 19, 2016.

*Primary Examiner* — Kristal Feggins
*Assistant Examiner* — Kendrick Liu
(74) *Attorney, Agent, or Firm* — Carter, DeLuca, Farrell & Schmidt, LLP (57) ABSTRACT

There is provided a light scanning apparatus that is free from main scanning jitter and allows size reduction of a deflector. The light scanning apparatus has a plurality of light sources, a deflector that deflects a plurality of light fluxes emitted from a plurality of light sources to scan a plurality of scanned surfaces along a main scanning direction, and a first stop arranged between the plurality of light sources and the deflector and provided with an aperture that regulates the width of the plurality of light fluxes with respect to the main scanning direction. The number of apertures of the first stop is smaller than the number of light sources.

19 Claims, 7 Drawing Sheets

(56) References Cited

U.S. PATENT DOCUMENTS

| | | | |
|---|---|---|---|
| 8,842,147 B2* | 9/2014 | Ohmiya | B41J 2/473 347/237 |
| 2003/0085346 A1 | 5/2003 | Yamawaki | |
| 2004/0169905 A1* | 9/2004 | Hayashi et al. | 359/204 |
| 2004/0240000 A1* | 12/2004 | Miyatake | G02B 13/0005 358/474 |
| 2013/0127973 A1* | 5/2013 | Ichii | G02B 26/10 347/224 |

FOREIGN PATENT DOCUMENTS

| | | |
|---|---|---|
| JP | 2004-309692 A | 11/2004 |
| JP | 2005-241680 A | 9/2005 |
| JP | 2007-011015 A | 1/2007 |
| JP | 2009-3124 A | 1/2009 |
| JP | 2009-103816 A | 5/2009 |
| JP | 2013-228448 A | 11/2013 |

* cited by examiner

LIGHT SCANNING APPARATUS AND IMAGE FORMING APPARATUS HAVING THE SAME

BACKGROUND OF THE INVENTION

Field of the Invention

The present invention relates to a light scanning apparatus which is particularly suitable for use in an image forming apparatus such as a laser beam printer, digital copying machine, and multi-function printer.

Description of the Related Art

There have been developed various light scanning apparatuses for color image forming apparatuses that form color images by superposing images of multiple colors. Japanese Patent Application Laid-Open No. 2009-103816 discloses a light scanning apparatus having stops as many as a plurality of light sources and employing a technique of spacing the stops apart from a polygon mirror to reduce light causing ghost images or increasing the oblique incidence angle of light fluxes on a deflector. Japanese Patent Application Laid-Open No. 2009-3124 discloses a light scanning apparatus having stops (or irises) as many as a plurality of light sources and employing a technique of arranging the stops at appropriate locations to facilitate separation of optical paths in a scanning optical system.

However, in cases where a system in which each of the plurality of light sources has a plurality of light emission points (multi-beam system) is employed, the plurality of light emission points are arranged with spacing between each other with respect to the main scanning direction. Consequently, the positions at which the principal rays of the light fluxes emitted from the plurality of light emission points are incident on the deflection surface of the polygon mirror are largely spaced apart from each other along the main scanning direction. Therefore, if a multi-beam system is employed in the apparatuses disclosed in Japanese Patent Application Laid-Open No. 2009-103816 and Japanese Patent Application Laid-Open No. 2009-3124, there arise a problem that the size of the deflector cannot be made small and a problem that a displacement of the focus position with respect to a scanned surface leads to a displacement of the positions of incidence of light fluxes on the scanned surface in the main scanning direction (main-scanning jitter), thereby deteriorating the image quality.

The present invention is intended to provide a light scanning apparatus that allows reduction of main-scanning jitter and size reduction of a deflector while using a plurality of light sources each having a plurality of light emission points.

SUMMARY OF THE INVENTION

A light scanning apparatus according to the present invention comprises a plurality of light sources, a deflector that deflects a plurality of light fluxes emitted from a plurality of light sources to scan a plurality of scanned surfaces along a main scanning direction, and a first stop arranged between the plurality of light sources and the deflector and provided with an aperture that regulates the width of the plurality of light fluxes with respect to the main scanning direction. The number of apertures of the first stop is smaller than the number of light sources.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In the following, a light scanning apparatus according to the present invention will be described with reference to the drawings. It should be noted that the drawings illustrate components at scales different from the actual scales in order to facilitate understanding of the present invention.

In the following description, the main scanning direction refers to the direction perpendicular to the axis of rotation of a deflector and the optical axis of an imaging optical system (i.e. the direction along which the light flux is reflected and deflected by the deflector), and the sub-scanning direction refers to the direction parallel to the axis of rotation of the deflector. Moreover, the main scanning section refers to a plane containing the main scanning direction and the optical axis of the imaging optical system, and the sub-scanning section refers to the plane containing the optical axis of the imaging optical system and perpendicular to the main scanning section.

Figure 1A:
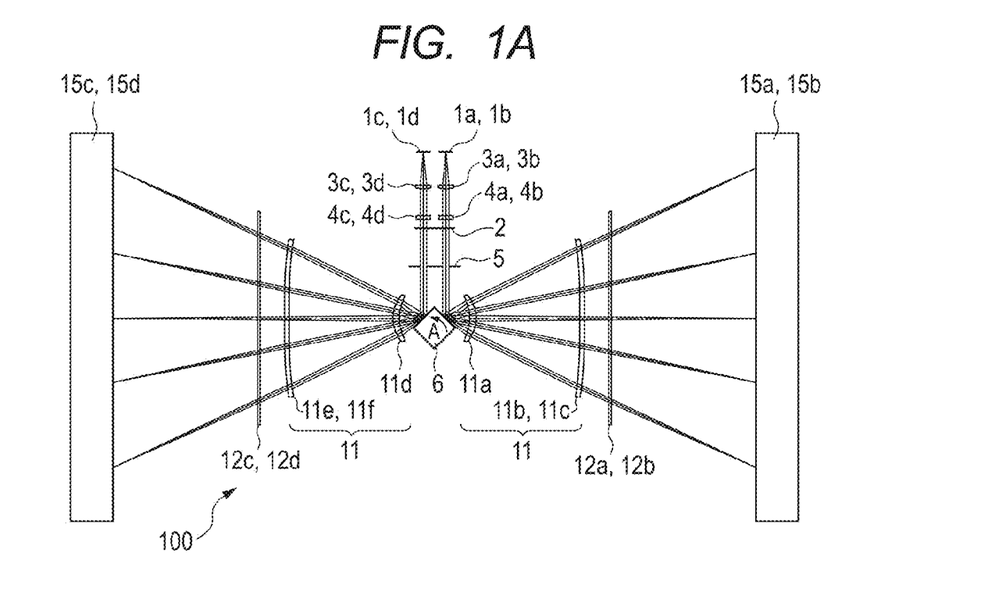
FIG. 1A is a schematic cross sectional view of a light scanning apparatus according to a first embodiment.
Figure 1B:
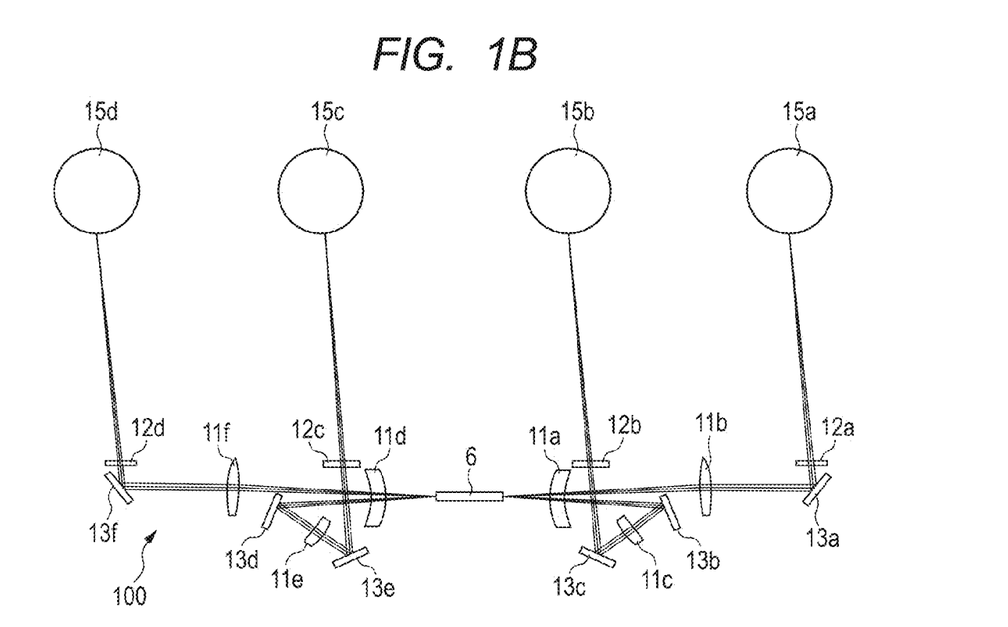
FIG. 1B is a schematic cross sectional view of the light scanning apparatus according to the first embodiment.
Figure 2A:
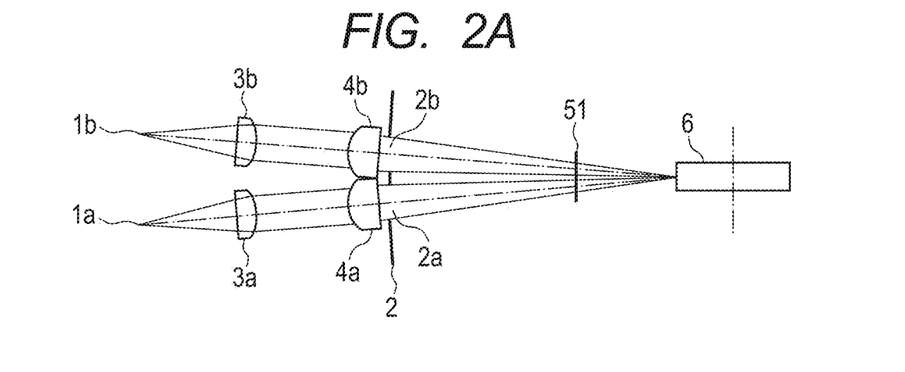
FIG. 2A is a schematic cross sectional view of an entrance optical system of the light scanning apparatus according to the first embodiment.
Figure 2B:
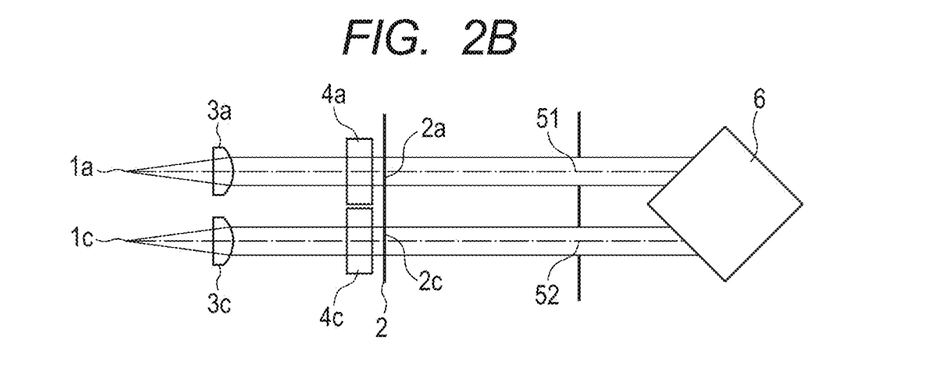
FIG. 2B is a schematic cross sectional view of the entrance optical system of the light scanning apparatus according to the first embodiment.

FIGS. 1A and 1B are schematic cross sectional views of a light scanning apparatus 100 according to a first embodiment of the present invention taken on the main scanning section and the sub-scanning section respectively. FIGS. 2A and 2B are schematic cross sectional views of an entrance optical system of the light scanning apparatus 100 taken on the sub-scanning section and the main scanning section respectively.

The light scanning apparatus 100 includes light sources 1a, 1b, 1c, 1d, a sub-scanning stop (diaphragm) 2, collimator lenses 3a, 3b, 3c, 3d, cylindrical lenses 4a, 4b, 4c, 4d, and a main scanning stop (diaphragm) 5. The light scanning apparatus 100 also includes a light deflector 6, scanning lenses 11a, 11b, 11c, 11d, 11e, 11f, and dust protective glass plates 12a, 12b, 12c, 12d. The light scanning apparatus 100 further includes mirrors 13a, 13b, 13c, 13d, 13e, 13f, and photosensitive drum surfaces 15a, 15b, 15c, 15d, which are surfaces to be scanned.

The light sources 1a to 1d, the sub-scanning stop 2, the collimator lenses 3a to 3d, the cylindrical lenses 4a to 4d, and the main scanning stop 5 constitute the entrance optical system of the light scanning apparatus 100. The scanning lenses 11a to 11f and the mirrors 13a to 13f constitute the imaging optical system of the light scanning apparatus 100.

Figure 3:
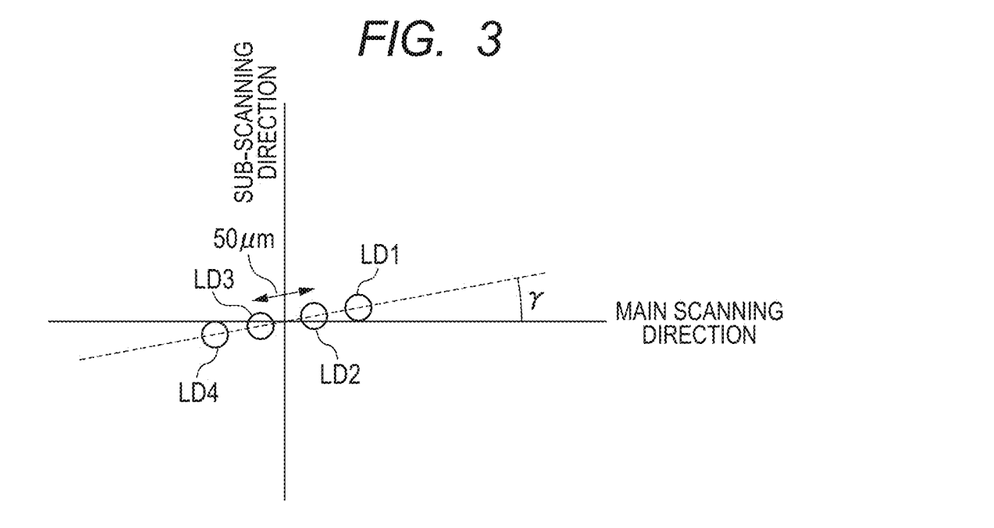
FIG. 3 is a diagram showing the arrangement of light emission points that each light source has.

Each of the light sources 1a to 1d is a semiconductor laser, which has four light emission points LD1, LD2, LD3, LD4 as shown in FIG. 3.

Figure 4:
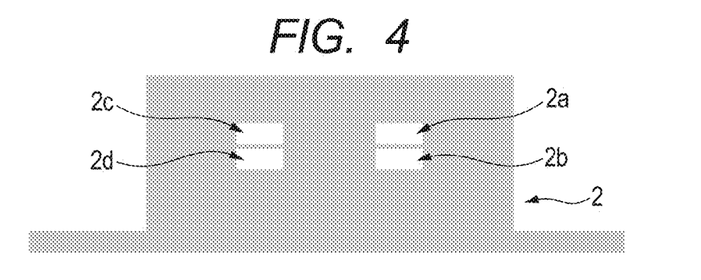
FIG. 4 is a front view of a sub-scanning stop of the light scanning apparatus according to the first embodiment.

The sub-scanning stop 2 is an aperture stop having rectangular apertures 2a, 2b, 2c, 2d as shown in FIG. 4, and regulates the width of the light fluxes emitted from the light sources 1a, 1b, 1c, 1d with respect to the sub-scanning direction. While in this embodiment the light fluxes emitted from the light sources 1a to 1d are adapted to pass respectively through the apertures 2a to 2d, the apertures 2a and 2c may be made continuous to be a single aperture and the apertures 2b and 2d may be also made continuous to be a single aperture.

The collimator lenses 3a to 3d convert the light fluxes emitted from the light sources 1a to 1d into light fluxes that are substantially parallel both in the main scanning direction and the sub-scanning direction.

The cylindrical lenses 4a to 4d have predetermined refractive powers only in the sub-scanning direction. They are plastic mold lenses.

Figure 5:
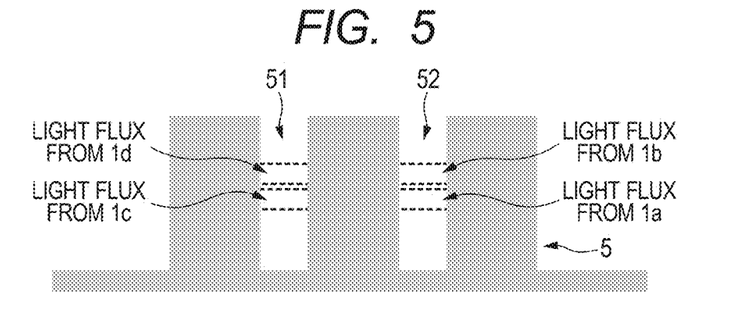
FIG. 5 is a front view of a main scanning stop of the light scanning apparatus according to the first embodiment.

The main scanning stop 5 is an aperture stop having rectangular apertures and regulates the width of the light fluxes with respect to the main scanning direction. As shown in FIG. 5, the main scanning stop 5 has apertures 51 and 52. The aperture 51 regulates the width of the light fluxes emitted from the light sources 1c and 1d with respect to the main scanning direction, and the aperture 52 regulates the width of the light fluxes emitted from the light sources 1a and 1b with respect to the main scanning direction. The apertures 51 and 52 are open at one end (upper end) with respect to the sub-scanning direction and the width of apertures 51 and 52 is wider than that of the light fluxes with respect to the sub-scanning direction.

The light deflector 6 includes, for example, a polygon mirror (i.e. rotary multi-face mirror), which is driven by drive means such as a motor (not shown) to rotate in the direction indicated by arrow A in FIG. 1A at a constant speed.

The scanning lenses 11a to 11f are fθ lenses having fθ characteristics. The scanning lenses 11a to 11f form spot images in the image areas on the scanned surfaces 15a to 15d. The scanning lenses 11a to 11f bring the deflecting surfaces (reflection surfaces) of the light deflector 6 or the positions near them and the photosensitive drum surfaces 15a to 15d as scanned surface or the positions near them into substantially conjugate relationship in the sub-scanning section. This relationship provides correction of surface tilt of the optical deflector 6.

The dust protective glass plates 12a to 12d are plane parallel glasses having no refractive power, which prevent the entrance of toner into the light scanning apparatus 100.

Here, a description will be made taking a black station as an example. A light flux emitted from the light source 1d, which is light-modulated based on image information, is regulated in its width of the light flux cross section by the aperture 2d of the sub-scanning stop 2 and the aperture 51 of the main scanning stop 5. The light flux is converted into a substantially parallel light flux by the collimator lens 3d and then incident on the cylindrical lens 4d. The light flux incident on the cylindrical lens 4d is left unchanged in the main scanning section but converged in the sub-scanning section and emerges from the cylindrical lens. Thus, the light flux forms a substantially focal linear image (linear image having a length parallel to the main scanning direction) on a deflection surface of the light deflector 6.

The light flux reflected and deflected by the deflection surface of the light deflector 6 is focused by the scanning lenses 11d and 11f onto the photosensitive drum surface 15d as a spot. As the light deflector 6 rotates in the direction of arrow A, the light flux optically scans the photosensitive drum surface 15d at a constant velocity along the main scanning direction. Thus, an image is recorded on the photosensitive drum surface 15d as a recording medium.

In the above process, it is necessary to determine the timing of the scanning start position on the photosensitive drum surface 15d before scanning the photosensitive drum surface 15d with light. For this purpose, a BD lens (not shown) is used to guide the light beam reflected and deflected by the light deflector 6 to a BD sensor (not shown). The timing of the scanning start position in image recording onto the photosensitive drum surface 15d by the light emission points LD1 to LD4 is determined using a synchronization signal (BD signal) based on an output signal of the BD sensor.

In this embodiment, the positions of the apertures 51 and 52 of the main scanning stop 5 are set in such a way that the interval of the light fluxes emitted from the LD1 and the LD4 with respect to the main scanning direction on the deflection surface is made small. This reduces a dot position displacement on the scanned surfaces 15a to 15d caused by a focus error of the scanning lenses 11a to 11f in the main scanning direction. A print position displacement ΔY along the main scanning direction resulting from a focus error of 1 mm on the scanned surface 15a to 15d can be calculated by the following equation (1):

$$\Delta Y = \frac{LW_m}{f_{f\theta}f_{col}}, \quad (1)$$

where L is the distance from the deflection surface to the main scanning stop, $W_m$ is the width of the light emission point along the main scanning direction, $f_{col}$ is the focal length of the entrance optical system with respect to the main scanning direction, and $f_{f\theta}$ is the focal length of the imaging optical system (i.e. fθ optical system) with respect to the main scanning direction.

Specifically, the above equation (1) is obtained as follows. Let M be the distance on the deflection surface of the deflector 6 between the light flux emitted from the light emission point LD1 and the light flux emitted from the light emission point LD4, and let α be the angle of the principal ray of the light flux emitted from the light emission point LD1 after passing through the collimator lens 3A, 3B, 3C, 3*d*. The principal ray refers to the ray passing through the center of the stop. In the case where there are a stop that regulates the width with respect to the main scanning direction and a stop that regulates the width with respect to the sub-scanning direction, the principal ray refers to the ray among rays travelling in the plane at the center of the regulated width with respect to the sub-scanning direction (i.e. in the main scanning section) that passes through the plane at the center of regulated width with respect to the main scanning direction (i.e. through the sub-scanning section). Moreover, let β be the angle of the principal ray of the light flux emitted from the light emission point LD1 that is incident on the scanned surface 15*a*, 15*b*, 15*c*, 15*d*. The above equation (1) is derived from the following.

$$W_m/2 = f_{col} \times \tan \alpha$$

$$M/2 = L \times \tan \alpha$$

$$M/2 = f_{f\theta} \times \tan \beta$$

$$\Delta Y/2 = 1 \times \tan \beta$$

FIG. 3 shows the arrangement of the light emission points LD1, LD2, LD3, and LD4 that each of the light sources 1*a* to 1*d* has.

The light emission points LD1 to LD4 are arranged in such a way as to be spaced apart from each other along the main scanning direction and offset along the sub-scanning direction. In FIG. 3, the horizontal axis represents the main scanning direction of the light sources 1*a* to 1*d*, and the vertical axis represents the sub-scanning direction. The light emission points LD1 to LD4 are arranged one-dimensionally at regular intervals of 50 μm, and they are arranged at regular intervals with respect to both the main scanning direction and the sub-scanning direction. The laser is arranged obliquely in accordance with the resolution in the sub-scanning direction. Moreover, the light emission points LD1 to LD4 are adapted to be capable of changing the rotational angle γ about the optical axis so as to achieve a desired sub-scanning intervals on the scanned surfaces 15*a* to 15*d* in adaptation to variations of the entrance optical system and the imaging optical system.

The beam emitted from the light emission point LD4 and the beam emitted from the light emission point LD1 have different angles of incidence on the scanned surfaces 15*a* to 15*d*. On the scanned surfaces 15*a* to 15*d*, the beam from the light emission point LD1 is the downstream beam or the front beam in scanning, and the beam from the light emission point LD4 is the upstream beam or the rear beam in scanning. The timing of starting the drawing is determined by a synchronization position detection signal of at least one of the beams emitted from the light emission points LD1 to LD4. In this embodiment, the time to start the drawing is detected from only the beam emitted from the light emission point LD4, namely the rearmost beam in scanning.

The collimator lenses 3*a* to 3*d* each have a planar entrance surface and a spherical exit surface. The collimator lenses 3*a* to 3*d* convert laser light into substantially parallel light and is adapted to reduce differences in focus positions on the scanned surface among the multiple beams to reduce differences in the spot diameters.

The cylindrical lenses 4*a* to 4*d* used in these embodiments are plastic lenses, which are integrally molded (though illustrated as separate parts in the drawing in order to facilitate understanding). A diffraction surface is provided on the entrance surface of each lens to reduce the variation in the spot diameter caused by environmental changes. The phase function of the diffraction surface is expressed by the following equation (2).

$$\Phi(y, z) = \frac{2\pi}{m\lambda} \{(E_1 y + E_2 y^2 + E_3 y^3 + \cdots + E_{10} y^{10}) + \\ z^2 (F_0 + F_1 y + F_2 y^2 + F_3 y^3 + \cdots + F_{10} y^{10})\}, \quad (2)$$

where m is the order of diffraction, $E_1$ to $E_{10}$ and $F_0$ to $F_{10}$ are phase factors. In this equation, the terms with $F_0$ to $F_{10}$ represent the power in the sub-scanning direction. In this embodiment, the order of diffraction m is 1, namely, first-order diffracted light is used to cancel a change in the refractive index and a change in the wavelength caused by a temperature rise, to facilitate manufacturing.

The shapes of the scanning lenses (fθ lenses) 11*a* to 11*f* are expressed by the following functions (3) and (4).

Scanning Start Side:

$$x = \frac{y^2/R}{1 + \sqrt{1 - (1+K)(y/R)^2}} + B_{4s} y^4 + B_{6s} y^6 + B_{8s} y^8 + B_{10s} y^{10} \quad (3)$$

Scanning End Side:

$$x = \frac{y^2/R}{1 + \sqrt{1 - (1+K)(y/R)^2}} + B_{4e} y^4 + B_{6e} y^6 + B_{8e} y^8 + B_{10e} y^{10} \quad (4)$$

Here, the point of intersection of each scanning lens and the optical axis is taken as the origin. The equations are given for the scanning start side and the scanning end side of the optical axis separately. The X axis is taken on the optical axis, the Y axis is taken in the direction perpendicular to the optical axis in the main scanning section, and the Z axis is taken in the direction perpendicular to the optical axis in the sub-scanning section. In the above equations, R is the curvature radius, K, B4, B6, B8, and B10 are aspheric coefficients. The suffix "s" to the coefficients indicates that the values are for the scanning start side, and the suffix "e" to the coefficients indicates that the values are for the scanning end side.

In this embodiment, the shapes of the scanning lenses 11*a* to 11*f* are symmetrical with respect to the optical axis in the main scanning direction. In other words, the spherical coefficients are identical between the scanning start side and the scanning end side.

In the sub-scanning direction, the curvature of both surfaces of the second scanning lens 11*b* in the sub-scanning section (i.e. the plane containing the optical axis and perpendicular to the main scanning section) is varied continuously on the scanning start side and on the scanning end side of the optical axis in the effective region of the lens.

Moreover, the first-order term of Z is continuously varied as a function of Y to tilt lens surfaces. Both surfaces of the scanning lens 11b are continuously tilted from the optical axis toward the off-axis along the main scanning direction, thereby achieving both reduction of deterioration of the spot and reduction of curvature of the scanning line.

In this embodiment, the shapes of the scanning lenses 11a to 11f in the sub-scanning direction are expressed by the following continuous functions (5) and (6):

$$S = \frac{z^2/r'}{1 + \sqrt{1 - (z/r')^2}} + \sum_{j=0}^{16} \sum_{k=1}^{8} m_{jk} y^j z^k \quad (5)$$

$$r' = r(1 + D_{2s}y^2 + D_{4s}y^4 + D_{6s}y^6 + D_{8s}y^8 + D_{10s}y^{10})$$

$$S = \frac{z^2/r'}{1 + \sqrt{1 - (z/r')^2}} + \sum_{j=0}^{16} \sum_{k=1}^{8} m_{jk} y^j z^k \quad (6)$$

$$r' = r(1 + D_{2e}y^2 + D_{4e}y^4 + D_{6e}y^6 + D_{8e}y^8 + D_{10e}y^{10}),$$

where r' is the curvature radius in the sub-scanning direction (namely, in the Z-X plane), and $D_2$, $D_4$, $D_6$, $D_8$, and $D_{10}$ are aspheric coefficients. The suffix "s" to the coefficients indicates that the values are for the scanning start side, and the suffix "e" to the coefficients indicates that the values are for the scanning end side. The equations are given for the scanning start side and the scanning end side of the optical axis separately. The X axis is taken on the optical axis, the Y axis is taken in the direction perpendicular to the optical axis in the main scanning section, and the Z axis is taken in the direction perpendicular to the optical axis in the sub-scanning section.

The scanning lenses 11a to 11f in these embodiments are plastic lenses having transmissive power. Thus, they are light in weight. Moreover, the use of aspheric surfaces can increase the design flexibility. The scanning lenses 11a to 11f may be made of glass. The scanning lenses 11a to 11f may be optical elements having diffractive power. In the case where the scanning lenses 11a to 11f are made of a glass material or have a diffractive surface, it is possible to provide a light scanning apparatus having excellent environment friendliness.

While in this embodiment, the scanning lens in each station is composed of two imaging optical elements, the number of optical elements is not limited to it. Light scanning apparatuses using a scanning lens composed of one or three or more imaging optical elements can also provide advantageous effects same as this embodiment.

Numerical data of the optical system in the light scanning apparatus 100 of this embodiment is given in the following tables. In the data in the table of the entrance optical system, r is the curvature radius (mm) (where 0 represents planar surface), d is the surface distance (mm), and N (790 nm) is the refractive power for light having a wavelength of 790 nm.

| | |
|---|---|
| wavelength used (mm) | 7.90E−07 |
| refractive index of imaging optical system | 1.529 |
| number of faces of deflector | 4 |
| circumcircle radius of deflector (mm) | 20 |
| rotation angle of deflector (±deg.) | 16.9 |
| incidence angle in main scanning direction (deg.) | 90 |
| incidence angle in sub-scanning direction (deg.) | 3 |
| axial deflection point-entrance surface of first imaging lens (mm) | 2.00E+01 |
| focal length of imaging lens (mm) | 1.86E+02 |

Coordinates of Rotation Center of Deflector

| | |
|---|---|
| X | −5.579 |
| Y | −4.416 |

Entrance Optical System

| | r | d | N(790 mm) |
|---|---|---|---|
| light source (light emission point) | 0.0000 | 18.3050 | 0.0000 |
| collimator lens | 0.0000 | 3.0000 | 1.7617 |
| | −15.2164 | 27.1750 | 0.0000 |
| cylindrical lens *1 | 58.6205 | 3.0000 | 1.5240 |
| | 0.00 | 2.9000 | 1.0000 |
| sub-scanning stop | | 33.9440 | |
| main scanning stop | | 40.0000 | |
| deflection surface | 0.0000 | 0.0000 | 1.0000 |

*1 Phase Function

| | phase factor |
|---|---|
| F0 | −2.00E−03 |
| F1 | 0.00E+00 |
| F2 | 0.00E+00 |
| F3 | 0.00E+00 |
| F4 | 0.00E+00 |
| F5 | 0.00E+00 |
| F6 | 0.00E+00 |

Scanning Optical System

| | | surface R1 | | surface R2 | |
|---|---|---|---|---|---|
| | | scanning start side (s) | scanning end side (e) | scanning start side (s) | scanning end side (e) |
| main scanning section | d | 5.00E+00 | | 5.150E+01 | |
| | R | −3.47E+01 | | −2.59E+01 | |
| | K | 2.38E−01 | K  2.38E−01 | K  −5.47E−01 | K  −5.47E−01 |
| | B4 | 1.85E−07 | B4  1.85E−07 | B4  −1.21E−06 | B4  −1.21E−01 |
| | B6 | 4.83E−08 | B6  4.83E−08 | B6  1.93E−08 | B6  1.93E−08 |
| | B8 | −1.82E−10 | B8  −1.82E−10 | B8  −3.30E−11 | B8  −3.30E−11 |
| | B10 | 1.99E−13 | B10  1.99E−13 | B10  −2.44E−14 | B10  −2.44E−14 |
| sub-scanning section | r | 2.50E+01 | | r  2.50E+01 | |
| | D2 | 0.00E+00 | D2  0.00E+00 | D2  −5.63E−04 | D2  2.43E−04 |
| | D4 | 0.00E+00 | D4  0.00E+00 | D4  1.17E−06 | D4  −3.14E−06 |
| | D6 | 0.00E+00 | D6  0.00E+00 | D6  −2.58E−09 | D6  1.58E−08 |

|  |  | surface R1 (cont.) |  | surface R2 (cont.) |  |
|---|---|---|---|---|---|
|  | D8 | 0.00E+00 | D8 | 0.00E+00 | D8 | 1.93E−11 | D8 | −2.53E−11 |
|  | D10 | 0.00E+00 | D10 | 0.00E+00 | D10 | −3.58E−14 | D10 | 2.46E−15 |

|  |  | surface R3 | | surface R4 | |
|---|---|---|---|---|---|
|  |  | scanning start side (s) | scanning end side (e) | scanning start side (s) | scanning end side (e) |
| main scanning section | d |  | 4.00E+00 |  | 1.35E+02 |
|  | R |  | −5.00E+02 |  | 3.95E+03 |
|  | K | 0.00E+00 | K  0.00E+00 | 1.47E+01 | K  1.47E+01 |
|  | B4 | 0.00E+00 | B4  0.00E+00 | −8.22E−07 | B4  −8.22E−07 |
|  | B6 | 0.00E+00 | B6  0.00E+00 | 1.98E−10 | B6  1.98E−10 |
|  | B8 | 0.00E+00 | B8  0.00E+00 | −4.33E−14 | B8  −4.33E−14 |
|  | B10 | 0.00E+00 | B10  0.00E+00 | 4.64E−18 | B10  4.64E−18 |
| sub-scanning section | r |  | 6.77E+01 |  | −3.97E+01 |
|  | D2 | 0.00E+00 | D2  0.00E+00 | 1.97E−04 | D2  1.97E−04 |
|  | D4 | 0.00E+00 | D4  0.00E+00 | −3.21E−08 | D4  −1.99E−09 |
|  | D6 | 0.00E+00 | D6  0.00E+00 | 3.75E−12 | D6  −3.75E−11 |
|  | D8 | 0.00E+00 | D8  0.00E+00 | 3.44E−15 | D8  2.66E−14 |
|  | D10 | 0.00E+00 | D10  0.00E+00 | −1.13E−18 | D10  −5.70E−18 |
| additional terms | m01 |  | −3.74E−03 |  | −8.20E−02 |
|  | m11 |  | 1.33E−04 |  | 1.17E−04 |
|  | m21 |  | 1.38E−05 |  | 2.32E−05 |
|  | m31 |  | 1.00E−06 |  | 8.41E−07 |
|  | m41 |  | 4.09E−09 |  | −2.91E−09 |
|  | m51 |  | −1.19E−09 |  | −9.07E−10 |
|  | m61 |  | −1.78E−11 |  | −9.15E−12 |
|  | m71 |  | 7.35E−13 |  | 5.13E−13 |
|  | m81 |  | 1.11E−14 |  | 5.44E−15 |
|  | m91 |  | −2.28E−16 |  | −1.46E−16 |
|  | m101 |  | −3.12E−18 |  | −1.25E−18 |
|  | m111 |  | 3.92E−20 |  | 2.60E−20 |
|  | m121 |  | 2.52E−22 |  | 2.33E−23 |
|  | m131 |  | −4.31E−24 |  | −3.36E−24 |
|  | m141 |  | 0.00E+00 |  | 0.00E+00 |
|  | m151 |  | 0.00E+00 |  | 0.00E+00 |
|  | m161 |  | 0.00E+00 |  | 0.00E+00 |

In the above tables, the expression "E-x" stands for "$10^{-x}$". Surface R1 is the surface of the scanning lens 11a facing the light deflector 6. Surface R2 is the surface of the scanning lens 11a facing the scanned surface 12. Surface R3 is the surface of the scanning lens 11b facing the light deflector 6. Surface R4 is the surface of the scanning lens 11b facing the scanned surface 12.

FIG. 4 is a front view of the sub-scanning stop 2 of the light scanning apparatus 100.

As shown in FIGS. 1A, 1B, 2A, and 2B, the sub scanning stop 2, which regulates mainly the width of the light flux with respect to the sub-scanning direction, is arranged between the cylindrical lenses 4a to 4d and the main scanning stop 5. The sub-scanning stop 2 has rectangular apertures 2a to 2d provided for the light sources 1a to 1d respectively. In this embodiment, the width of the apertures 2a to 2d along the sub-scanning direction is 2.1 mm.

FIG. 5 is a front view of the main scanning stop 5 of the light scanning apparatus 100.

As shown in FIGS. 1A, 1B, 2A, and 2B, the main scanning stop 5, which regulates mainly the width of the light flux with respect to the main scanning direction, is arranged between the sub-scanning stop 2 and the deflector 6. The main scanning stop 5 has the aperture 51 provided commonly for the light sources 1c and 1d and the aperture 52 provided commonly for the light sources 1a and 1b. In this embodiment, the width of the apertures 51 and 52 along the main scanning direction is 3.6 mm.

The apertures 51 and 52 of the main scanning stop 5 in this embodiment are formed as slits that open at the top to facilitate manufacturing. Variations of the slit width among lasers are reduced, enabling high resolution.

As described above, the light scanning apparatus 100 according to this embodiment has four light sources 1a to 1d, each of which has four light emission points (lasers) LD1 to LD4 to emit four beams. Thus, the beams scan four different scanned surfaces 15a to 15d to form images on them. Moreover, the two openings 51 and 52 are provided in the main scanning stop 5 to improve optical performance.

The principal rays of the light fluxes emitted from the light emission points LD2 and LD3 pass through the collimator lenses 3a to 3d at locations near the optical axis and through the main scanning stop 5. On the other hand, the principal rays of the light fluxes emitted from the light emission points LD1 and LD4 pass through the collimator lenses 3a to 3d at off-axis locations, intersect with each other in the main scanning stop 5, and are incident on the deflector 6. The distance between the main scanning stop 5 and the deflection surface of the deflector 6 in the state in which the light fluxes are deflected onto the axes of the scanning lenses 11a and 11b is represented by L. The light fluxes deflected by the deflector 6 are transmitted through the scanning lenses 11a to 11f and focused onto the scanned surfaces 15a to 15d.

In the following, the reason why a focus position error of the scanning lenses 11a to 11f in the main scanning section, if it occurs, causes a displacement of the print position on the scanned surface 15a to 15d with respect to the main scanning direction will be described.

Figure 6:
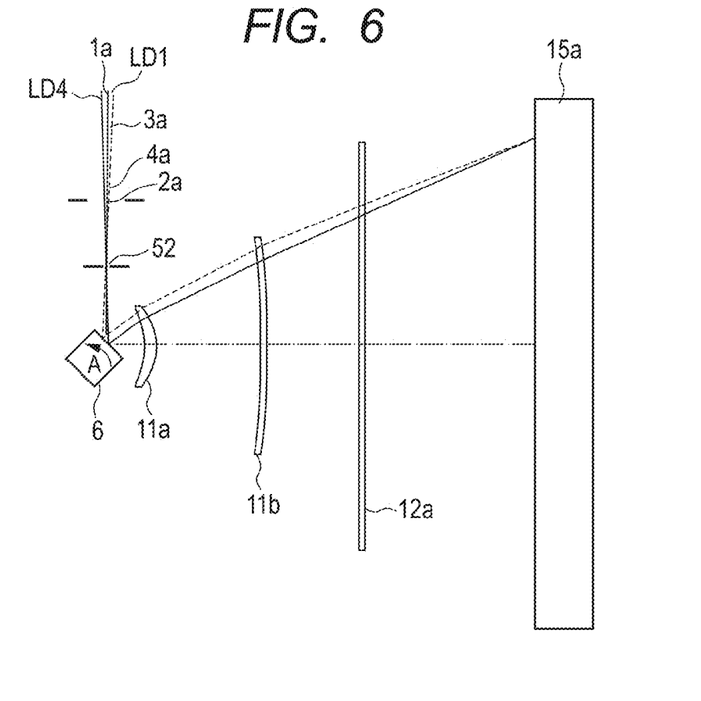
FIG. 6 is a diagram illustrating how light fluxes emitted from a light source are deflected for scanning in the light scanning apparatus according to the first embodiment.

FIG. 6 shows how light fluxes emitted from the light source 1a are deflected for scanning in the light scanning apparatus 100 of this embodiment.

In FIG. 6, the principal ray of the light flux emitted from the light emission point LD1 is drawn by a broken line, and the principal ray of the light flux emitted from the light emission point LD4 is drawn by a solid line. As described above the light fluxes emitted from the light emission points LD1 and LD4 are incident on the deflection surface of the deflector 6 at angles of incidence different from each other and, consequently, they are incident and focused on the scanned surface 15a at the same position with respect to the main scanning direction at different angles.

In consequence, if the position with respect to the optical axis direction at which the light fluxes, which are intended to be focused at the same position with respect to the main scanning direction on the scanned surface 15a, take the same position with respect to the main scanning direction is displaced from the scanned surface due to a manufacturing error, a displacement of the spot positions on the scanned surface with respect to the main scanning direction results. In the state in which there is a positive displacement of the focus (namely, in the state in which the position with respect to the optical axis direction at which the light fluxes take the same position with respect to the main scanning direction is farther from the deflector than the scanned surface), the light fluxes emitted from the light emission points LD1 and LD4 do not form a spot at the same position with respect to the main scanning direction on the scanned surface 15a but form spots at positions displaced from each other along the main scanning direction. This state will be referred to as "positive displacement". On the other hand, in the state in which there is a negative displacement of the focus (namely, in the state in which the position with respect to the optical axis direction at which the light fluxes take the same position with respect to the main scanning direction is closer to the deflector than the scanned surface), the light fluxes emitted from the light emission points LD1 and LD4 do not form a spot at the same position with respect to the main scanning direction on the scanned surface 15a but form spots at positions displaced from each other along the main scanning direction. In this case, the direction of displacement is reverse to the aforementioned plus displacement. This state will be referred to as "minus displacement".

As above, when there is no focus error by the scanning lens 11a and the scanning lens 11b, the light fluxes emitted from the light emission points LD1, LD2, LD3, and LD4 pass, in the mentioned order, the same position with respect to the main scanning direction on the scanned surface 15a at predetermined time intervals. On the other hand, if there is a focus error (curvature of field) with respect to the main scanning direction by the scanning lens 11a and the scanning lens 11b, there arises a problem of variation in the distance with respect to the main scanning direction between the principal rays of the light fluxes emitted from the light emission points LD1 to LD4. Specifically, the distance between the principal rays deviates from a predetermined distance in accordance with the magnitude and direction of the focus error of the scanning lenses 11a and 11b in the main scanning direction.

Figure 7:
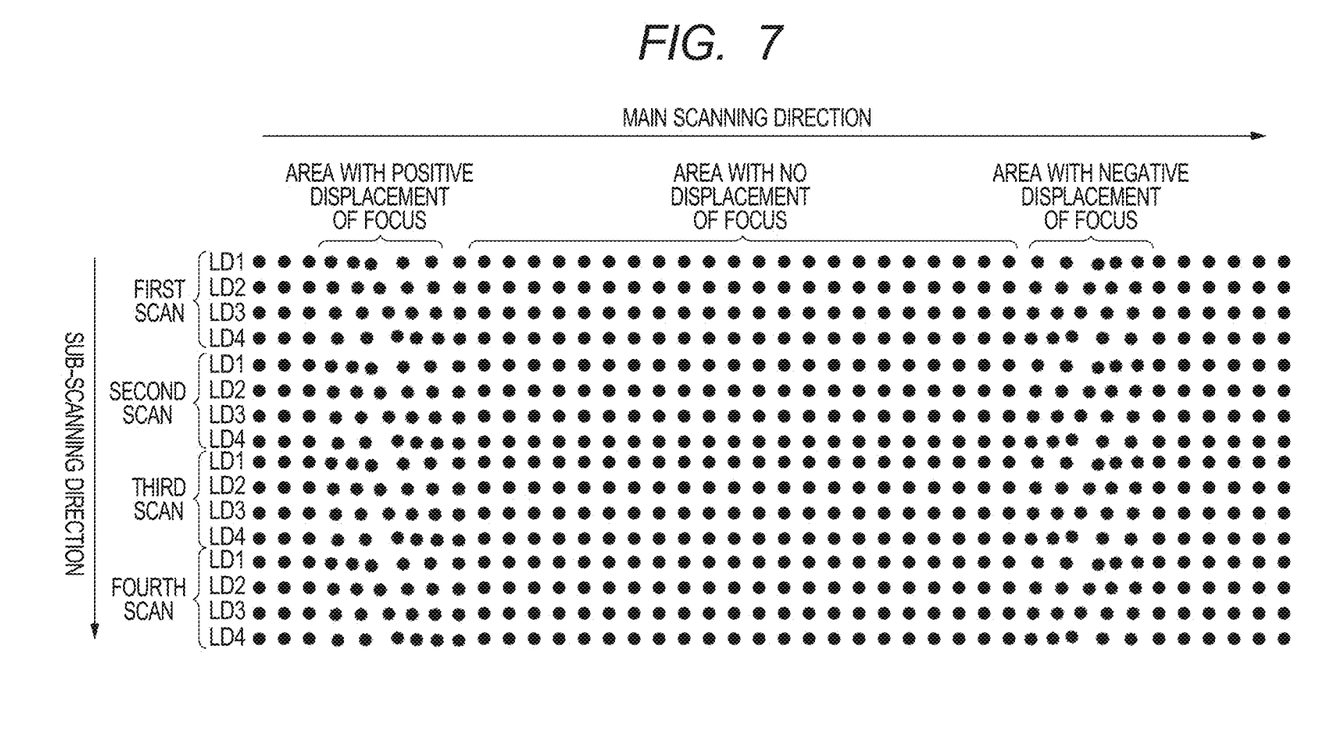
FIG. 7 is a diagram showing the positions of dots formed on a scanned surface in a case where the light emission points are controlled to emit light at regular intervals.

FIG. 7 schematically shows dots formed on the scanned surface when the light emission from the light emission points LD1 to LD4 are controlled in such a way that light is emitted at regular intervals.

In FIG. 7, the vertical direction is the sub-scanning direction, and the horizontal direction is the main scanning direction. As shown FIG. 7, in the region free from a focus error of the scanning lenses with respect to the main scanning direction, the dots corresponding to the light emission points LD1 to LD4 are formed at regular intervals along the main scanning direction. On the other hand, if there is a focus error of the scanning lenses with respect to the main scanning direction, the dots corresponding to the light emission points LD1 to LD4 are not formed at regular intervals along the main scanning direction. Such dot displacement with respect to the main scanning direction will lead to color misalignment when multiple colors are superposed. Moreover, since the displacement repeatedly appears in the sub-scanning direction at the beam cycle (four beams in this embodiment), moire will appear to deteriorate the image quality.

To reduce the above-mentioned deterioration of the image quality, the position of the main scanning stop 5 and the main scanning focal lengths of the entrance optical system and the imaging optical system are determined in such a way that the print position displacement ΔY along the main scanning direction is kept in the range from one-twentieth to twice the pixel size.

In the light scanning apparatus 100 of this embodiment, the resolution R with respect to the main scanning direction is 600 dpi, and the distance L from the main scanning stop 5 to the deflection surface of the deflector 6 is 40 mm. The distance $W_m$ between the light emission point LD1 and the light emission point LD4 along the main scanning direction is 0.09 mm, the main scanning focal length $f_{fθ}$ of the imaging optical system (fθ optical system) is 187 mm, and the main scanning focal length $f_{col}$ of the entrance optical system is 20 mm.

With these values, the print position displacement ΔY along the main scanning direction is calculated from equation (1) to be 0.00096 mm as shown by the following equation (7):

$$\Delta Y = \frac{L W_m}{f_{fθ} f_{col}} = \frac{40.0 \times 0.09}{187 \times 20} = 0.00096. \tag{7}$$

The value calculated by equation (7) satisfies the following condition (8):

$$\Delta Y < 2 \times \frac{25.4}{R}. \tag{8}$$

Condition (8) specifies a range of the dot displacement ΔY on the scanned surface 15a to 15d resulting from a displacement in the optical axis direction of 1 mm of the focus position with respect to the main scanning direction. Specifically, in the case of a typical image forming apparatus having a resolution R with respect to the main scanning direction of 600 dpi, it is necessary for the dot displacement ΔY resulting from a focus error (or focus displacement) of 1 mm to be kept smaller than twice the pixel size. Since one inch is equal to 25.4 mm, it is necessary that the above condition (8) be satisfied.

If condition (8) is not satisfied, dot displacement resulting from a focus error of 1 mm will cause moiré, leading to undesirable deterioration in the image quality.

Moreover, it is preferred that the width $D_s$ of the apertures of the main scanning stop along the sub-scanning direction be set in such a way as to satisfy the following condition (9):

$$D_s \geq \Delta z + L\left(\frac{|\beta_s| k \lambda}{\rho_s} + 2 \tan|\theta|\right). \tag{9}$$

In the above condition, Δz is the distance with respect to the sub-scanning direction on the deflection surface between the principal ray of the light flux emitted from the light source of the upper station with respect to the sub-scanning direction and the principal ray of the light flux emitted from the light source of the lower station with respect to the sub-scanning direction, L is the distance from the main scanning stop to the deflection surface of the deflector, $\beta_s$ is the magnification of the imaging optical system with respect to the sub-scanning direction, k is a truncation factor, $\lambda$ is the wavelength of the light flux emitted from the light source, $\rho_s$ is the spot diameter with respect to the sub-scanning direction on the scanned surface, and $\theta$ is the oblique incidence angle with respect to the sub-scanning direction of the light flux emitted from the light source on the deflection surface of the deflector.

In the light scanning apparatus 100 of this embodiment, $\Delta z$ is 0 mm, L is 40 mm, $|\beta_s|$ is 1.76, k is 1.4, $\lambda$ is $0.79 \times 10^{-3}$ mm, $\rho_s$ is 0.07 mm, and $|\theta|$ is 3°. Thus, the value of the right side of condition (9) is calculated to be 5.3 mm as shown by the following equation (10):

$$\Delta z + L\left(\frac{|\beta_s|k\lambda}{\rho_s} + 2\tan|\theta|\right) = \qquad (10)$$

$$0 + 40\left(\frac{1.76 \times 1.4 \times 0.79 \times 10^{-3}}{0.07} + 2 \times \tan(3°)\right) = 5.3.$$

The width $D_s$ in the sub-scanning direction of the apertures 51 and 52 of the main scanning stop 5 in the light scanning apparatus 100 of this embodiment satisfies condition (9).

If condition (9) is not satisfied, it is not possible to regulate the light fluxes with respect to the main scanning direction. This is undesirable.

As described above, in the multi-beam light scanning apparatus, the number of the main scanning stops is smaller than the number of the light sources, and the configurations of the entrance optical system including the main scanning stop and the imaging optical system are appropriately designed. With these features, a light scanning apparatus having high resolution can be provided at a low price. Moreover, if the light scanning apparatus according to the present invention is used in a color image forming apparatus, high-definition color images free from color misregistration can be produced.

Figure 8A:
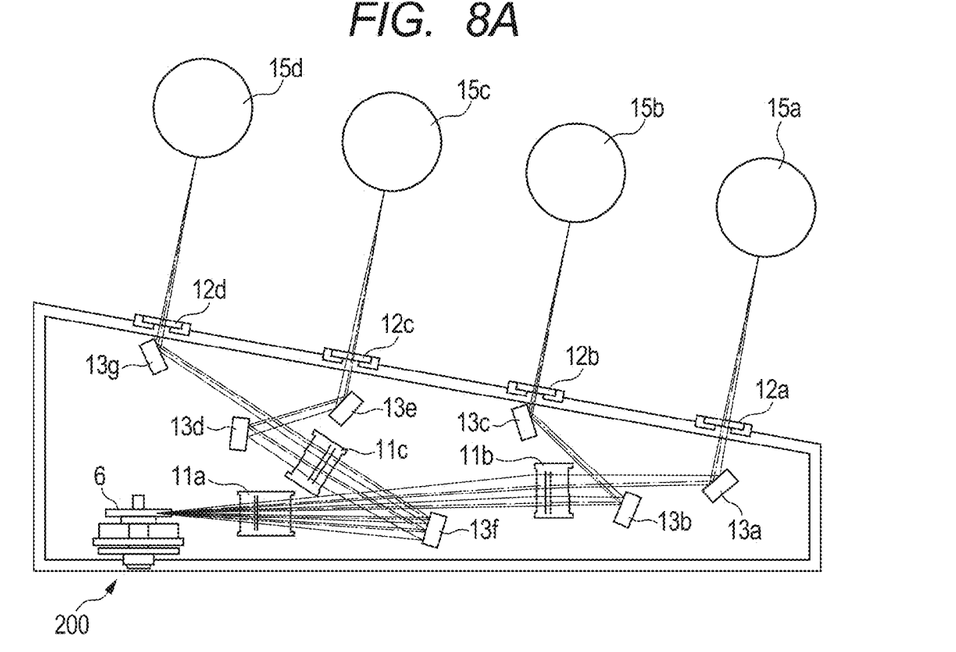
FIG. 8A is a schematic cross sectional view of a light scanning apparatus according to a second embodiment taken in a sub-scanning section.
Figure 8B:
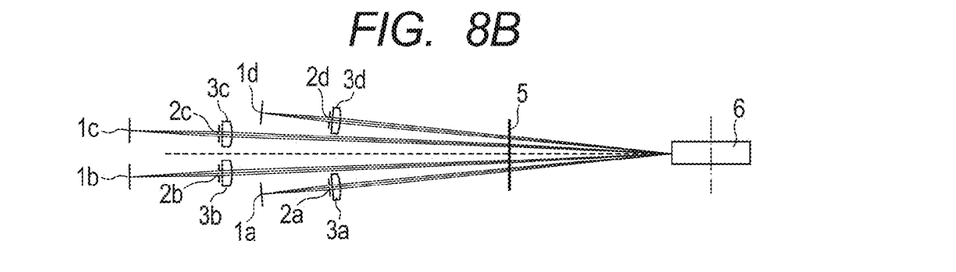
FIG. 8B is a schematic cross sectional view of an entrance optical system of the light scanning apparatus according to the second embodiment taken in the sub-scanning section.
Figure 8C:
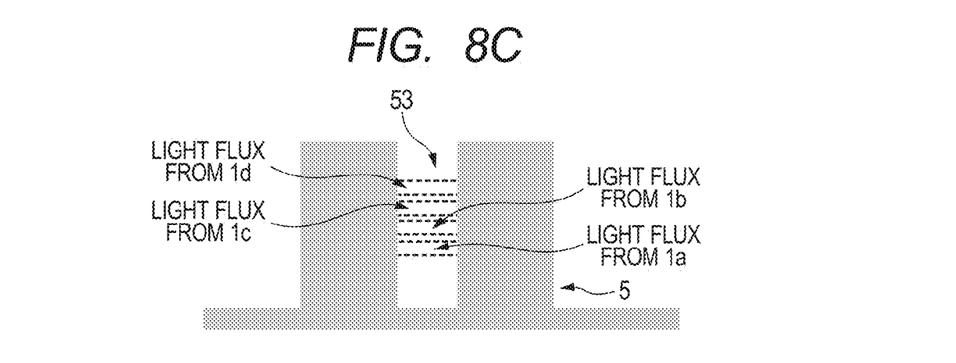
FIG. 8C is a front view of a main scanning stop of the light scanning apparatus according to the second embodiment.

FIG. 8A is a schematic cross sectional view of a light scanning apparatus 200 according to a second embodiment of the present invention taken in the sub-scanning section. FIG. 8B is a schematic cross sectional view of an entrance optical system of the light scanning apparatus 200 taken in the sub-scanning section. FIG. 8C is a front view of a main scanning stop 5 of the light scanning apparatus 200.

The light scanning apparatus 200 according to this embodiment differs from the light scanning apparatus 100 according to the first embodiment in the configurations of the entrance optical system and the scanning optical system. In the other respects, the light scanning apparatus 200 is the same as the light scanning apparatus 100 according to the first embodiment.

Specifically, in the light scanning apparatus 200, the distances between the photosensitive drums 15a to 15d are made shorter to reduce the size of the main body. To this end, the scanning optical system is configured in such a way that light fluxes emitted from four light sources 1a to 1d are incident on the same deflection surface of the deflector 6. In other words, a one-side scanning system is employed.

Optical components in the light scanning apparatus 200 of this embodiment having functions the same as those in the light scanning apparatus 100 according to the first embodiment are denoted by the same reference symbols.

As shown in FIG. 8B, the light scanning apparatus 200 uses what is called a sub-scanning oblique incidence optical system in which the light fluxes emitted from the light sources 1a and 1d are incident on the deflection surface of the deflector at angles of ±4.2° in the sub-scanning direction and the light fluxes emitted from the light sources 1b and 1c are incident on the same deflection surface of the deflector at angles of ±2° in the sub-scanning direction. With this arrangement, a one-side scanning system can be achieved without increasing the height of the deflection surface of the deflector 6.

The main scanning stop 5 of the light scanning apparatus 200 has only one aperture 53. Therefore, the number of apertures is smaller than the number of apertures of the main scanning stop 5 of the light scanning apparatus 100 according to the first embodiment, and the difference between the number of apertures and the number of light sources is increased. With this feature, the variation of the spot diameters on the scanned surface due to variation in the stop diameters among light fluxes can be further reduced as compared to the light scanning apparatus 100 according to the first embodiment.

In the following, calculations with the numerical values of the dimensions in the light scanning apparatus 200 of this embodiment will be given.

In the light scanning apparatus 200 of this embodiment, for example, the resolution R in the main scanning direction is 600 dpi, and the distance L from the main scanning stop 5 to the deflection surface of the deflector 6 is 40 mm. The distance $W_m$ between the light emission point LD1 and the light emission point LD4 along the main scanning direction is 0.09 mm, the main scanning focal length $f_{f\theta}$ of the imaging optical system (f$\theta$ optical system) is 210 mm, and the main scanning focal length $f_{col}$ of the entrance optical system is 30 mm.

With these values, the print position displacement $\Delta Y$ along the main scanning direction is calculated from equation (1) to be 0.00057 mm as shown by the following equation (11):

$$\Delta Y = \frac{LW_m}{f_{f\theta}f_{col}} = \frac{40.0 \times 0.09}{210 \times 30} = 0.00057. \qquad (11)$$

The value of $\Delta Y$ calculated by equation (11) satisfies the following condition (12):

$$\Delta Y < 2 \times \frac{25.4}{R}. \qquad (12)$$

Condition (12) specifies a range of the dot displacement $\Delta Y$ on the scanned surface 15a to 15d resulting from a displacement in the optical axis direction of 1 mm of the focus position with respect to the main scanning direction. Specifically, in the case of a typical image forming apparatus having a resolution R with respect to the main scanning direction of 600 dpi, it is necessary for the dot displacement $\Delta Y$ resulting from a focus error (or focus displacement) of 1 mm to be kept smaller than twice the pixel size. Since one inch is equal to 25.4 mm, it is necessary that the above condition (12) be satisfied.

If condition (12) is not satisfied, dot displacement resulting from a focus error of 1 mm will cause moiré, leading to undesirable deterioration in the image quality.

Moreover, it is preferred that the width $D_s$ of the aperture of the main scanning stop along the sub-scanning direction be set in such a way as to satisfy the following condition (13):

$$D_s \geq \Delta z + L\left(\frac{|\beta_s|k\lambda}{\rho_s} + 2\tan|\theta|\right). \quad (13)$$

In the above condition, $\Delta z$ is the distance with respect to the sub-scanning direction on the deflection surface between the principal ray of the light flux emitted from the light source of the upper station with respect to the sub-scanning direction and the principal ray of the light flux emitted from the light source of the lower station with respect to the sub-scanning direction, L is the distance from the main scanning stop to the deflection surface of the deflector, $\beta_s$ is the magnification of the imaging optical system with respect to the sub-scanning direction, k is a truncation factor, $\lambda$ is the wavelength of the light flux emitted from the light source, $\rho_s$ is the spot diameter with respect to the sub-scanning direction on the scanned surface, and $\theta$ is the oblique incidence angle with respect to the sub-scanning direction of the light flux emitted from the light source on the deflection surface of the deflector.

In the light scanning apparatus 200 of this embodiment, $\Delta z$ is 0 mm, L is 40 mm, $|\beta_s|$ is 1.2, k is 1.4, $\lambda$ is $0.79 \times 10^{-3}$ mm, $\rho_s$ is 0.075 mm, and $|\theta|$ is 4.2°. Thus, the value of the right side of condition (13) is calculated to be 6.58 mm as shown by the following equation (14):

$$\Delta z + L\left(\frac{|\beta_s|k\lambda}{\rho_s} + 2\tan|\theta|\right) = \quad (14)$$
$$0 + 40\left(\frac{1.2 \times 1.4 \times 0.79 \times 10^{-3}}{0.075} + 2 \times \tan(4.2°)\right) = 6.58.$$

The width $D_s$ in the sub-scanning direction of the aperture 53 of the main scanning stop 5 in the light scanning apparatus 200 of this embodiment satisfies condition (13).

If condition (13) is not satisfied, the light fluxes are regulated by the main scanning stop with respect to the sub-scanning direction. This is undesirable.

As described above, in the multi-beam light scanning apparatus, the number of the main scanning stops is smaller than the number of the light sources, and the configurations of the entrance optical system including the main scanning stop and the imaging optical system are appropriately designed. With these features, a light scanning apparatus having high resolution can be provided at a low price. Moreover, if the light scanning apparatus according to the present invention is used in a color image forming apparatus, high-definition color images free from color misregistration can be produced.

Figure 9A:
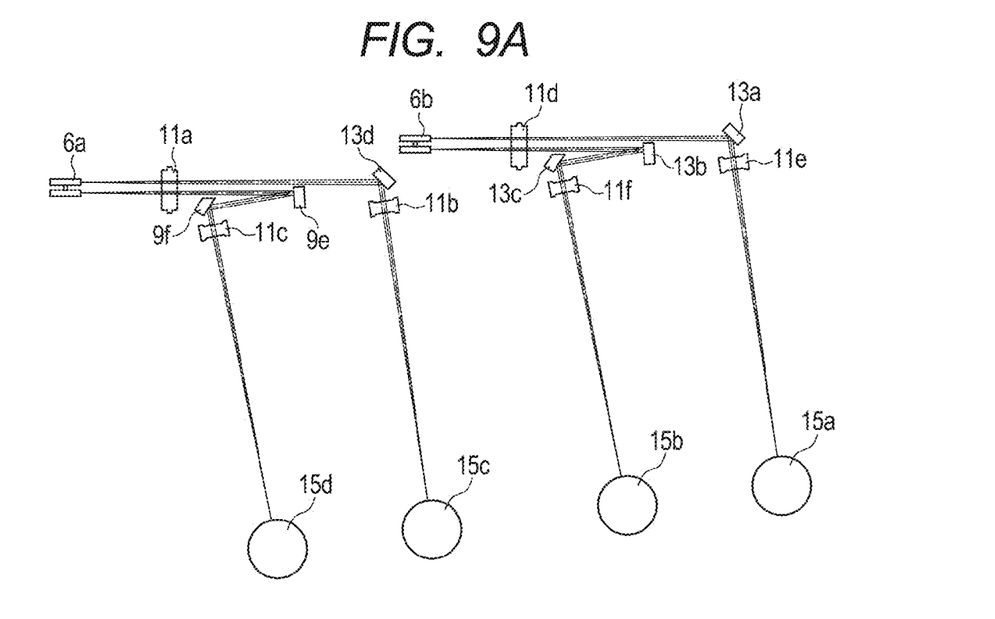
FIG. 9A is a schematic cross sectional view of a light scanning apparatus according to a third embodiment taken in a sub-scanning section.
Figure 9B:
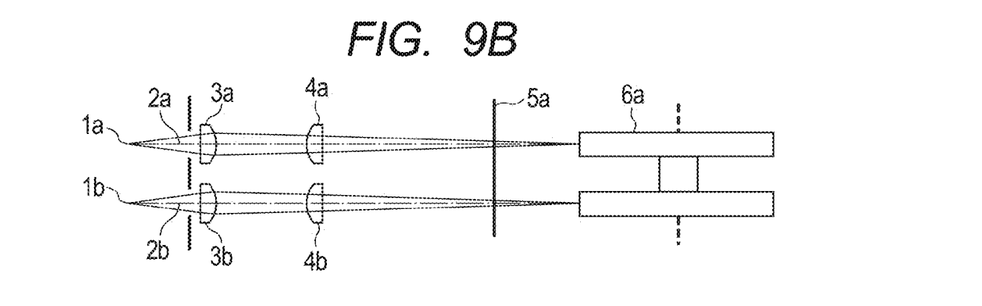
FIG. 9B is a schematic cross sectional view of an entrance optical system of the light scanning apparatus according to the third embodiment taken in the sub-scanning section.
Figure 9C:
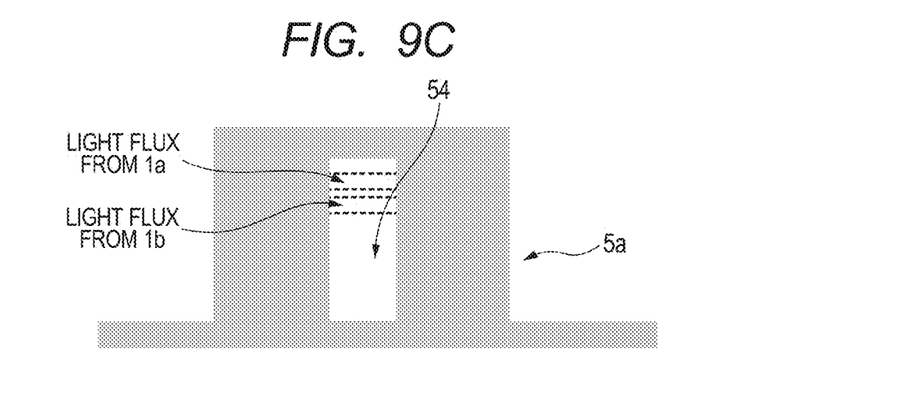
FIG. 9C is a front view of a main scanning stop of the light scanning apparatus according to the third embodiment.

FIG. 9A is a schematic cross sectional view of a light scanning apparatus 300 according to a third embodiment of the present invention taken in the sub-scanning section. FIG. 9B is a schematic cross sectional view of an entrance optical system of the light scanning apparatus 300 taken in the sub-scanning section. FIG. 9C is a front view of a main scanning stop 5a of the light scanning apparatus 300.

The light scanning apparatus 300 according to this embodiment differs from the light scanning apparatus 100 according to the first embodiment in the configurations of the entrance optical system and the scanning optical system. In the other respects, the light scanning apparatus 300 is the same as the light scanning apparatus 100 according to the first embodiment.

Specifically, the light scanning apparatus 300 has deflectors 6a and 6b each of which has two polygon mirrors arranged along the sub-scanning direction. The two polygon mirrors are rotated by one motor.

Optical components in the light scanning apparatus 300 of this embodiment having functions the same as those in the light scanning apparatus 100 according to the first embodiment are denoted by the same reference symbols.

Arranging two polygon mirrors along the sub-scanning direction in each of the deflectors 6a and 6b provides an advantageous effect that it is possible to scan a plurality of scanned surfaces 15a to 15d without making light fluxes emitted from light sources 1a to 1d incident obliquely on the polygon mirrors.

Moreover, the light scanning apparatus 300 has two main scanning stops 5a and 5b each of which has one aperture 54. Thus, the total number of apertures (two) is smaller than the total number of light sources (four). This enables reduction of the variation in the spot diameters on the scanned surface due to variation in the stop aperture diameters among light fluxes.

As shown in FIG. 9B, light fluxes emitted from the light sources 1a and 1b are incident on the deflection surfaces of the corresponding polygon mirrors of the deflector 6a perpendicularly (namely, at an angle of 0° with respect to the sub-scanning direction). This arrangement can reduce banding caused by changes of the surface position of the polygon mirror (or eccentricity of the surfaces) in the directions perpendicular to it, which can occur in the sub-scanning oblique incidence optical system.

As shown in FIG. 9C, the main scanning stops 5a and 5b of the light scanning apparatus 300 each have a rectangular aperture 54 having a closed top. The closed top can block light causing ghost images.

In the following, calculations with the numerical values of the dimensions in the light scanning apparatus 300 of this embodiment will be given.

In the light scanning apparatus 300 of this embodiment, for example, the resolution R in the main scanning direction is 1200 dpi, and the distance L from the main scanning stop 5a, 5b to the deflection surface of the deflector 6a, 6b is 30 mm. The distance $W_m$ between the light emission point LD1 and the light emission point LD4 along the main scanning direction is 0.27 mm, the main scanning focal length $f_{f\theta}$ of the imaging optical system (fθ optical system) is 275.46 mm, and the main scanning focal length $f_{col}$ of the entrance optical system is 30 mm.

With these values, the print position displacement $\Delta Y$ along the main scanning direction is calculated from equation (1) to be 0.00098 mm as shown by the following equation (15):

$$\Delta Y = \frac{L W_m}{f_{f\theta} f_{col}} = \frac{30.0 \times 0.27}{275.46 \times 30} = 0.00098. \quad (15)$$

The value of $\Delta Y$ calculated by equation (15) satisfies the following condition (16):

$$\Delta Y < 2 \times \frac{25.4}{R}. \quad (16)$$

Condition (16) specifies a range of the dot displacement $\Delta Y$ on the scanned surface 15a to 15d resulting from a displacement in the optical axis direction of 1 mm of the focus position with respect to the main scanning direction. Specifically, in the case of a typical image forming apparatus having a resolution R with respect to the main scanning direction of 1200 dpi, it is necessary for the dot displacement ΔY resulting from a focus error (or focus displacement) of 1 mm to be kept smaller than twice the pixel size. Since one inch is equal to 25.4 mm, it is necessary that the above condition (16) be satisfied.

If condition (16) is not satisfied, dot displacement resulting from a focus error of 1 mm will cause moiré, leading to undesirable deterioration in the image quality.

Moreover, it is preferred that the width $D_s$ of the aperture of the main scanning stops along the sub-scanning direction be set in such a way as to satisfy the following condition (17):

$$D_s \geq \Delta z + L\left(\frac{|\beta_s|k\lambda}{\rho_s} + 2\tan|\theta|\right). \quad (17)$$

In the above condition, Δz is the distance with respect to the sub-scanning direction on the deflection surface between the principal ray of the light flux emitted from the light source of the upper station with respect to the sub-scanning direction and the principal ray of the light flux emitted from the light source of the lower station with respect to the sub-scanning direction, L is the distance from the main scanning stop to the deflection surface of the deflector, $\beta_s$ is the magnification of the imaging optical system with respect to the sub-scanning direction, k is a truncation factor, λ is the wavelength of the light flux emitted from the light source, $\rho_s$ is the spot diameter with respect to the sub-scanning direction on the scanned surface, and θ is the oblique incidence angle with respect to the sub-scanning direction of the light flux emitted from the light source on the deflection surface of the deflector.

In the light scanning apparatus 300 of this embodiment, Δz is 5 mm, L is 30 mm, $|\beta_s|$ is 1.2, k is 1.4, λ is 0.78×10⁻³ mm, $\rho_s$ is 0.070 mm, and |θ| is 0°. Thus, the value of the right side of condition (17) is calculated to be 5.56 mm as shown by the following equation (18):

$$\Delta z + L\left(\frac{|\beta_s|k\lambda}{\rho_s} + 2\tan|\theta|\right) = \quad (18)$$
$$5 + 30\left(\frac{1.2 \times 1.4 \times 0.78 \times 10^{-3}}{0.070} + 2 \times \tan(0°)\right) = 5.56.$$

The width $D_s$ in the sub-scanning direction of the aperture 54 of the main scanning stop 5a, 5b in the light scanning apparatus 300 of this embodiment is 10 mm, and condition (17) is satisfied.

If condition (17) is not satisfied, the light fluxes are regulated by the main scanning stops with respect to the sub-scanning direction. This is undesirable.

As described above, in the multi-beam light scanning apparatus, the number of the main scanning stops is smaller than the number of the light sources, and the configurations of the entrance optical system including the main scanning stop and the imaging optical system are appropriately designed. With these features, a light scanning apparatus having high resolution can be provided at a low price. Moreover, if the light scanning apparatus according to the present invention is used in a color image forming apparatus, high-definition color images free from color misregistration can be produced.

Figure 10:
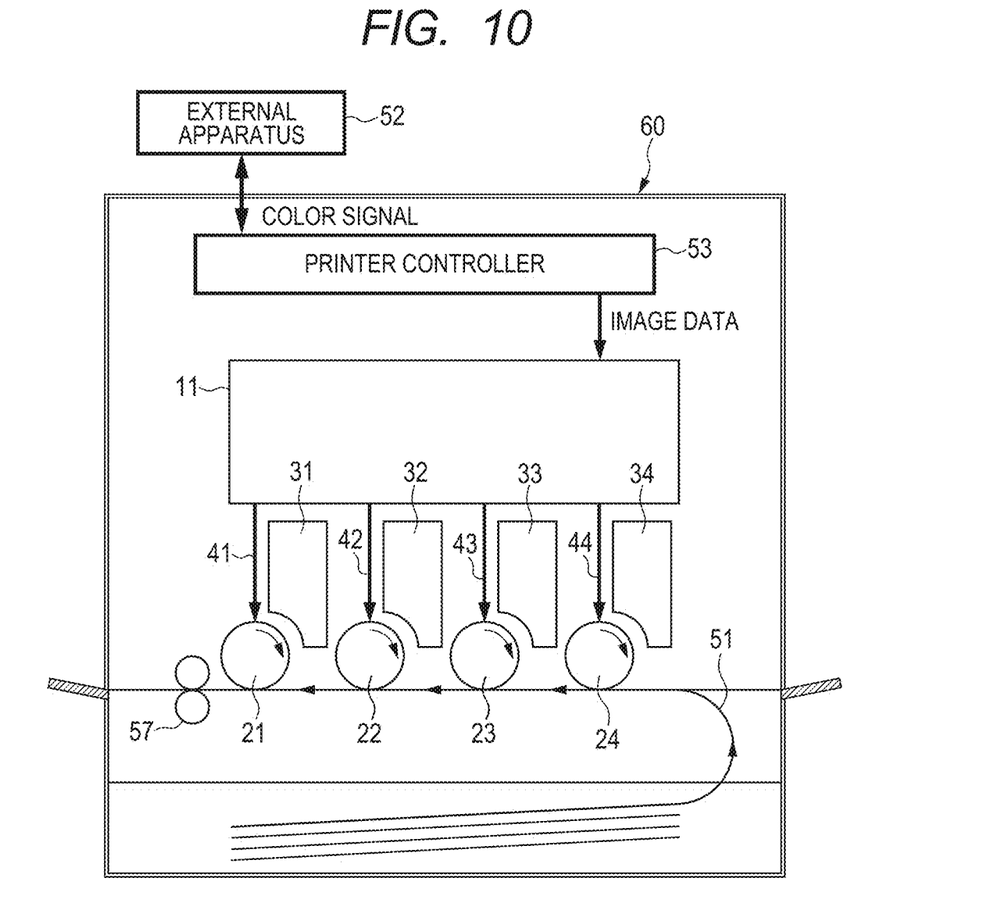
FIG. 10 is a schematic cross sectional view of relevant portions of a color image forming apparatus equipped with a light scanning apparatus according to the present invention taken in a sub-scanning section.

FIG. 10 is a schematic cross sectional view of relevant portions of a color image forming apparatus 60 equipped with a light scanning apparatus according to the present invention, taken in the sub-scanning section.

The color image forming apparatus 60 includes a light scanning apparatus 11, a photosensitive drums 21, 22, 23, 24 as image bearing members (photosensitive members), developing units 31, 32, 33, 34, and a conveyer belt 51.

The color image forming apparatus 60 receives color signals of R (red), G (green), B (blue) from an external apparatus 52 such as a personal computer. The received code data of the color signals are converted by a printer controller 53 in the apparatus into image data (dot data) of respective colors of Y (yellow), M (magenta), C (cyan), and K (black). The image data is input to the light scanning apparatus 11. Then, the light scanning apparatus 11 emit light beams 41, 42, 43, 44 modulated based on the image data of the respective colors, and the photosensitive surfaces of the photosensitive drums 21 to 24 are scanned by the light beams along the main scanning direction.

In the color image forming apparatus 60, the light scanning apparatus 11 performs scanning using four beams, which correspond to colors of Y (yellow), M (magenta), C (cyan), and K (black) respectively. The beams form electrostatic latent images corresponding to image signals (image information) on the drum surfaces of the respective photosensitive drums 21 to 24 arranged in parallel. The electrostatic latent images thus formed are developed by developing units 31 to 34 respectively, so that toner images are formed. Thereafter, the toner images are transferred by a transferring unit (not shown) onto a recording material as a transfer target material in a superposed manner. Then, the toner images transferred in a superposed manner are fixed on the recording material by a fixing unit 57, so that a single full-color image is formed on the recording material.

The external apparatus 52 may be, for example, a color image reading apparatus having a CCD sensor. In this case, the color image reading apparatus and the color image forming apparatus 60 constitute a color digital copying machine.

In the present invention, a stop is provided commonly for a plurality of light sources. This enables a reduction of variation in spot diameters on the scanned surface resulting from variation in the positions and diameters of stops and enables forming high-definition images.

Consequently, in a light scanning apparatus that scans two or more scanning surfaces using the same deflection surface of a deflector, reduction of the positional displacement of the dot in the main scanning direction and reduction in the size and diameter of the deflector can be achieved at the same time. Therefore, it is possible to provide a light scanning apparatus that can form high-definition images at high speed using multi-beam light sources and to provide an image forming apparatus using such a light scanning apparatus.

According to the present invention, a main scanning stop is provided commonly for a plurality of light sources so that the number of apertures that a main scanning stop (first stop) has is smaller than the number of the plurality of light sources. With this feature, there can be provided a light scanning apparatus that allows reduction of main scanning jitter and size reduction of a deflector.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-006929, filed Jan. 17, 2014, which is hereby incorporated by reference herein in its entirety.

What is claimed is:

1. A light scanning apparatus comprising:
first and second light sources, either of which comprises a plurality of light emission points;
a deflector that deflects first and second light fluxes emitted from the first and second light sources to scan first and second scanned surfaces along a main scanning direction;
a first stop arranged between the first and second light sources and the deflector and provided with a shared aperture that regulates the width of the first and second light fluxes with respect to the main scanning direction; and
a second stop arranged between the first and second light sources and the first stop and configured to regulate the width of the first and second light fluxes with respect to a sub-scanning direction.

2. A light scanning apparatus according to claim 1, wherein the second stop is provided with a shared aperture through which a plurality of light fluxes pass, each of the plurality of light fluxes being incident on respective scanned surfaces different from each other.

3. A light scanning apparatus according to claim 1, wherein the aperture that the first stop has is open at one end with respect to the sub-scanning direction.

4. A light scanning apparatus according to claim 1, wherein the deflector deflects the first and second light fluxes by a first deflection surface.

5. A light scanning apparatus according to claim 4, wherein the first stop is provided with a first aperture through which the first and second light fluxes pass.

6. A light scanning apparatus according to claim 4, wherein an optical path from the first light source to the first deflection surface and an optical path from the second light source to the first deflection surface overlap each other in their projections on a main scanning section.

7. A light scanning apparatus according to claim 4, further comprising third and fourth light sources, wherein the deflector deflects third and fourth light fluxes emitted from the third and fourth light sources by a second deflection surface other than the first deflection surface to scan third and fourth scanned surfaces.

8. A light scanning apparatus according to claim 7, wherein an optical path from the third light source to the second deflection surface and an optical path from the fourth light source to the second deflection surface overlap each other in their projections on a main scanning section.

9. A light scanning apparatus according to claim 7, wherein the second stop is provided with first, second, third and fourth apertures that regulate the width of the first to fourth light fluxes with respect to the sub-scanning direction, respectively.

10. A light scanning apparatus according to claim 7, wherein the a second stop is provided with a first aperture that regulates the width of the first and third light fluxes with respect to the sub-scanning direction and a second aperture that regulates the width of the second and fourth light fluxes with respect to the sub-scanning direction.

11. A light scanning apparatus according to claim 1, wherein the first stop is provided with apertures the number of which is smaller than the number of light sources.

12. A light scanning apparatus according to claim 11, wherein the first stop is provided with an aperture through which the first and second light fluxes pass.

13. A light scanning apparatus according to claim 1, further comprising an entrance optical system that causes the first and second light fluxes to be incident on a deflection surface of the deflector obliquely in a sub-scanning section.

14. A light scanning apparatus according to claim 1, wherein the apparatus has no component that regulates the width of the first and second light fluxes with respect to the main scanning direction, besides the first stop.

15. A light scanning apparatus according to claim 1, further comprising third and fourth light sources, wherein
the first stop is provided with first and second apertures,
the second stop is provided with first, second, third, and fourth apertures,
the light fluxes emitted from the first, second, third, and fourth light sources pass through the first, second, third, and fourth apertures of the second stop respectively, and then the light fluxes emitted from the first and second light sources pass through the first aperture of the first stop, while the light fluxes emitted from the third and fourth light sources pass through the second aperture of the first stop.

16. A light scanning apparatus according to claim 1, further comprising:
third and fourth light sources, wherein
the first stop is provided with first and second apertures,
the second stop is provided with first and second apertures,
the first light flux passes through the first aperture of the second stop and then through the first aperture of the first stop,
the second light flux passes through the second aperture of the second stop and then through the first aperture of the first stop,
a light flux emitted from the third light source passes through the first aperture of the second stop and then through the second aperture of the first stop, and
a light flux emitted from the fourth light source passes through the second aperture of the second stop and then through the second aperture of the first stop.

17. An image forming apparatus comprising:
a light scanning apparatus according to claim 1;
a developing unit that develops electrostatic latent images formed on the first and second scanned surfaces by the light scanning apparatus into toner images;
a transferring unit that transfers the developed toner images onto a transfer material; and
a fixing unit that fixes the transferred toner images on the transfer material.

18. A light scanning apparatus comprising:
a plurality of light sources;
a deflector that deflects a plurality of light fluxes emitted from the plurality of light sources to scan a plurality of scanned surfaces along a main scanning direction;
a first stop arranged between the plurality of light sources and the deflector and provided with an aperture that regulates the width of the plurality of light fluxes with respect to the main scanning direction, the number of apertures of the first stop being smaller than the number of light sources; and
a plurality of imaging optical systems that converge the plurality of light fluxes deflected by the deflector onto the plurality of scanned surfaces, wherein the apparatus satisfies the following condition:

$$D_s \geq \Delta z + L\left(\frac{|\beta_s|k\lambda}{\rho_s} + 2\tan|\theta|\right),$$

where $D_s$, is the width of the aperture of the first stop with respect to the sub-scanning direction, $\Delta z$ is the distance with respect to the sub-scanning direction on the deflection surface between the principal rays of the light fluxes passing through the same aperture of the first stop, L is the distance from the first stop to the deflection surface, $\beta_s$ is the magnification of the plurality of imaging optical systems in a sub-scanning section, k is a truncation factor, $\lambda$ is the wavelength of the plurality of light fluxes, $\rho_s$ is the spot diameter of the plurality of light fluxes with respect to the sub-scanning direction on the scanned surfaces, and $\theta$ is the oblique incidence angle in the sub-scanning section of the plurality of light fluxes on the deflection surface.

19. A light scanning apparatus comprising:
a plurality of light sources;
a deflector that deflects a plurality of light fluxes emitted from the plurality of light sources to scan a plurality of scanned surfaces along a main scanning direction; and
a first stop arranged between the plurality of light sources and the deflector and provided with a shared aperture that regulates the width of the plurality of light fluxes with respect to the main scanning direction, wherein
the plurality of light sources include first, second, third, and fourth light sources,
the deflector has first and second deflection surfaces,
the first deflection surface deflects first and second light fluxes emitted from the first and second light sources to scan first and second scanned surfaces,
the second deflection surface deflects third and fourth light fluxes emitted from the third and fourth light sources to scan third and fourth scanned surfaces, and
the third and fourth light fluxes pass through the shared aperture of the first stop.

\* \* \* \* \*